US008257775B2

(12) United States Patent
Axelrod et al.

(10) Patent No.: US 8,257,775 B2
(45) Date of Patent: Sep. 4, 2012

(54) MOLDED PRODUCTS BASED UPON TEXTURED VEGETABLE PROTEIN

(75) Inventors: Glen S. Axelrod, Colts Neck, NJ (US); Ajay Gajria, Monmouth Junction, NJ (US)

(73) Assignee: T.F.H. Publications, Inc., Neptune City, NJ (US)

( * ) Notice: Subject to any disclaimer, the term of this patent is extended or adjusted under 35 U.S.C. 154(b) by 1064 days.

(21) Appl. No.: 11/688,734

(22) Filed: Mar. 20, 2007

(65) Prior Publication Data

US 2008/0233243 A1 Sep. 25, 2008

(51) Int. Cl.
*A23K 1/18* (2006.01)
*A23J 3/14* (2006.01)
(52) U.S. Cl. .......... 426/656; 426/72; 426/580; 426/622; 426/641; 426/805; 426/512
(58) Field of Classification Search .................. 426/72, 426/580, 622, 641, 656, 805, 512
See application file for complete search history.

(56) References Cited

U.S. PATENT DOCUMENTS

| | | | | |
|---|---|---|---|---|
| 3,814,823 A | * | 6/1974 | Yang et al. ................. | 426/601 |
| 3,870,805 A | * | 3/1975 | Hayes et al. ............... | 426/656 |
| 3,968,268 A | * | 7/1976 | Sair et al. .................. | 426/580 |
| 3,984,576 A | | 10/1976 | Burkwall, Jr. et al. | |
| 4,001,441 A | * | 1/1977 | Liepa ......................... | 426/104 |
| 4,044,158 A | | 8/1977 | Burkwall, Jr. | |
| 4,251,556 A | | 2/1981 | Burkwall, Jr. et al. | |
| 4,255,379 A | * | 3/1981 | Frankland, Jr. ........... | 264/328.17 |
| 4,306,848 A | * | 12/1981 | Nunn ......................... | 425/208 |
| 4,310,558 A | * | 1/1982 | Nahm, Jr. .................. | 426/98 |
| 4,454,163 A | | 6/1984 | Gellman et al. | |
| 4,454,164 A | | 6/1984 | Gellman et al. | |
| 4,517,218 A | | 5/1985 | Yackel, Jr. et al. | |
| 4,534,990 A | | 8/1985 | Gellman et al. | |
| 4,546,001 A | | 10/1985 | Gellman et al. | |
| 4,740,379 A | * | 4/1988 | Noguchi et al. ........... | 426/512 |
| 4,743,460 A | | 5/1988 | Gellman et al. | |
| 4,743,461 A | | 5/1988 | Gellman et al. | |
| 4,800,099 A | * | 1/1989 | Gellman et al. ........... | 426/641 |
| 5,200,212 A | | 4/1993 | Axelrod | |
| 5,240,720 A | | 8/1993 | Axelrod | |
| 5,339,771 A | | 8/1994 | Axelrod | |
| 5,419,283 A | * | 5/1995 | Leo ............................ | 119/709 |
| 5,476,069 A | | 12/1995 | Axelrod | |
| 5,523,293 A | * | 6/1996 | Jane et al. .................. | 530/356 |
| 5,626,899 A | | 5/1997 | Payne et al. | |
| 5,827,565 A | | 10/1998 | Axelrod | |
| 5,941,197 A | | 8/1999 | Axelrod | |
| 6,056,991 A | | 5/2000 | Axelrod | |
| 6,067,941 A | | 5/2000 | Axelrod | |
| 6,086,940 A | | 7/2000 | Axelrod | |
| 6,093,427 A | | 7/2000 | Axelrod | |
| 6,093,441 A | | 7/2000 | Axelrod | |
| 6,110,521 A | | 8/2000 | Axelrod | |
| 6,126,978 A | | 10/2000 | Axelrod | |
| 6,159,516 A | * | 12/2000 | Axelrod et al. ............ | 426/456 |
| 6,165,474 A | | 12/2000 | Frudakis et al. | |
| 6,180,161 B1 | | 1/2001 | Axelrod | |
| 6,228,418 B1 | | 5/2001 | Gluck et al. | |
| 6,379,725 B1 | * | 4/2002 | Wang et al. ................ | 426/72 |
| 6,455,083 B1 | * | 9/2002 | Wang ......................... | 426/104 |
| 6,576,246 B1 | * | 6/2003 | Denesuk et al. ........... | 424/400 |
| 6,586,027 B2 | * | 7/2003 | Axelrod et al. ............ | 426/132 |
| 6,672,252 B2 | * | 1/2004 | Levin et al. ................ | 119/709 |
| 6,821,538 B2 | * | 11/2004 | Axelrod et al. ............ | 426/132 |
| 6,916,497 B2 | | 7/2005 | Axelrod et al. | |
| 7,082,894 B2 | | 8/2006 | Sherrill et al. | |
| 7,537,794 B2 | * | 5/2009 | Baldus ....................... | 426/635 |
| 7,541,057 B2 | * | 6/2009 | Bhattacharya et al. ... | 426/634 |
| 7,579,038 B1 | * | 8/2009 | Weinberg ................... | 426/656 |
| 2001/0022980 A1 | * | 9/2001 | Bell et al. ................... | 424/771 |
| 2005/0008758 A1 | | 1/2005 | Howse et al. | |
| 2005/0084599 A1 | | 4/2005 | Umeda et al. | |
| 2006/0088650 A1 | | 4/2006 | McGrane | |
| 2006/0165854 A1 | | 7/2006 | Levin et al. | |
| 2006/0188611 A1 | * | 8/2006 | Unlu et al. ................. | 426/89 |
| 2006/0188632 A1 | | 8/2006 | Nie et al. | |
| 2007/0031556 A1 | * | 2/2007 | Axelrod et al. ............ | 426/516 |
| 2007/0031557 A1 | | 2/2007 | Axelrod et al. | |
| 2007/0264415 A1 | * | 11/2007 | Axelrod et al. ............ | 426/623 |

FOREIGN PATENT DOCUMENTS

GB 1583644 A * 1/1981

OTHER PUBLICATIONS

1 Page downloaded from http://web.archive.org/web/20060212084002/http://www.soyfoodsillinois.uiuc.edu/recipes, dated Feb. 12, 2006.*
International Search Report and Written Opinion dated Jun. 25, 2008 issued in related International Patent Application No. PCT/US08/57520 (7 pages).
EPO Search Report from corresponding EPO Application No. 08744073.1 dated May 26, 2010.
L.C. Cavitt, et al. JFS: Sensory and Nutritive Qualities of Food. "Prediction of Poultry Meat Tenderness Using Razor Blade Shear, Allo-Kramer Shear, and Sarcomere Length". vol. 69, Nr. 1, 2004- Journal of Food Science. pp. 11-15. Published on Web Jan. 7, 2004. © 2004 Institute of Food Technologists. www.ift.org.
Harvard School of Public Health. "Protein". © 2007 President and Fellows of Harvard College. Internet printout. 9pgs.
bbc.co.uk. Food. "Vegan Proteins". Internet printout dated Mar. 7, 2007. 3pgs.
ADM North America. "Vegetable Protein Products". Copyright © 2007 Archer Daniels Midland. Internet printout. 2pgs.

(Continued)

*Primary Examiner* — Chhaya Sayala
(74) *Attorney, Agent, or Firm* — Grossman, Tucker, Perreault & Pfleger, PLLC

(57) ABSTRACT

A molded animal chew toy or pet treat that is formed by molding of textured vegetable protein (TVP). The TVP may include fibrous material and may be combined with a resin (binder) and a plasticizer and formed by a heating molding machine, such as an injection molding or extrusion operation. The resin and plasticizer content may be selected to optimize the molding process.

14 Claims, No Drawings

OTHER PUBLICATIONS

HappyCow's Vegetarian Guide to Restaurants & Health Food Stores. "Vegetarian Protein Guide". © 1999-2007 HappyCow's Vegetarian Guide to Restaurants & Health Food Stores. Internet printout. 3pgs.

TVP®. (Textured Vegetable Proteins). www.admworld.com. Tel. 877-236-2460. ADM Alliance Nutrition, 1000 North 30th Street, Quincy, IL 62301. 2pgs., dated prior to May 2007.

TVP® and Fortified TVP Textured Vegetable Proteins 165†and 163†Series. 4666 East Faries Parkway, Decatur, IL 62526. Tel: 217-424-5200. Fax: 217-451-8067. specialtyingredients@admworld.com. www.admworld.com. 1 pg., dated prior to May 2007.

* cited by examiner

MOLDED PRODUCTS BASED UPON TEXTURED VEGETABLE PROTEIN

TECHNICAL FIELD

The present disclosure relates to animal chews and pet treats, particularly for dogs, cats and other related animals, and more particularly, to a molded animal chew or pet treat which may contain textured vegetable protein (TVP). The TVP may be present at a relatively high concentration as compared to other ingredients, and may include a resin binder and a plasticizer. The chew or treat may also be enriched with vitamins, minerals and/or herb additives to facilitate the delivery of such ingredients to the animal through the chewing process.

BACKGROUND

A variety of disclosures exist pertaining to the development of edible dog chews that are digestible and nutritious along with a texture that can be individually adjusted to suit a wide variety of a dog's preferences or needs. Attention is therefore directed to the following exemplary disclosures: U.S. Pat. Nos. 6,180,161 "Heat Modifiable Edible Dog Chew; 6,159,516 "Method of Molding Edible Starch; 6,126,978 "Edible Dog Chew"; 6,110,521 "Wheat and Casein Dog Chew with Modifiable Texture"; 6,093,441 "Heat Modifiable Peanut Dog Chew"; 6,093,427 "Vegetable Based Dog Chew"; 6,086,940 "High Starch Content Dog Chew"; 6,067,941 "Animal Chew"; 6,056,991 "Turkey and Rice Dog Chew With Modifiable Texture"; 5,941,197 "Carrot Based Dog Chew"; 5,827,565 "Process for Making an Edible Dog Chew"; 5,339,771 "Animal Chew Toy Containing Animal Meal; 5,240,720 "Dog Chew with Modifiable Texture"; 5,200,212 "Dog Chew with Modifiable Texture". Attention is also directed to U.S. Pat. No. 6,165,474 entitled "Application for Patent for Nutriceutical Toy" and U.S. Pat. No. 5,419,283 entitled "Animal Chew Toy of Starch Material and Degradable Ethylene Copolymer".

U.S. Pat. Nos. 6,586,027 and 6,916,497 both entitled "Health Chew Toy" are assigned to the assignee of the present invention and are included herein in their entirety by reference. These patents are directed at molded, completely digestible, nutritious animal chews, enriched with vitamins, minerals and/or herb additives.

Chew products have been defined as articles which may be intended for chewing by the animal for an extended period of time to provide exercise, clean the animal's teeth and even provide nutrition. Pet treats may be distinguished from chews in that they may be intended to be chewed for a relatively short time and then digested, often offered to the animal as a reward for accomplishing a trick or task. In either case, in today's world of weight watching, even for pets, it may be important for treats and chews to be nutritious and organic as well as providing at least a portion of the daily recommended amounts of such ingredients, and even provide functional benefits to the animal. Additives may be included in such chews and treats, targeted at specific systems within the animal's body and/or the proper functioning of those systems over a given or extended time period. Of particular interest are chews and treats for pets which may be low in fat content, gluten free and relatively high in protein.

While the above certainly contributes to the body of chew products and treats available to an animal, there is nonetheless a need to improve on the above, particularly with respect to heat forming (e.g. molding) and incorporating protein products within such chew products.

SUMMARY

In a first exemplary embodiment, the present disclosure relates to a molded animal chew or pet treat comprising resin, plasticizer and textured vegetable protein (TVP), wherein the TVP is present at a level of equal to or greater than about 50% by weight, and wherein the textured vegetable protein comprises fibrous material wherein the plasticizer content is less or equal to about 40% by weight.

In a second exemplary embodiment, the present disclosure relates to a method for forming an edible animal chew toy or pet treat comprising combining resin, a plasticizer and TVP to form a mixture, wherein the TVP is present at a level of equal to or greater than about 50% by weight, and wherein the textured vegetable protein comprises fibrous material. This may then be followed by introducing the mixture to a heated molding machine and molding and cooling the mixture to form the chew toy or pet treat wherein the plasticizer content of said chew toy is less than or equal to about 40% by weight.

In a third exemplary embodiment the present disclosure relates to a method for direct injection molding textured vegetable protein in an injection molding machine including a screw, a barrel and a mold to produce a molded animal chew or pet treat. The method includes introducing TVP, a resin and plasticizer directly into an injection molding machine wherein the TVP is present at a level of equal to or greater than about 50% by weight, and wherein the textured vegetable protein comprises fibrous material. This may be followed by mixing the resin, the textured vegetable protein and the plasticizer in said molding machine to provide a mixture and forming said mixture into a molded shape. With regard to such direct injection molding process, a modified screw may be used which may include a transition zone that is greater than one-half the length of the feed zone.

DETAILED DESCRIPTION

The present invention relates to the development of a molded resin-based edible chew toy or pet that includes textured vegetable protein (TVP). The vegetable protein may be present at levels of greater than or equal to about 50% by weight, including all values and increments therein. For example, between about 50% by weight to 99% by weight. Therefore, the TVP may comprise, for example, between 50%-60% by weight of the molded product, 50%-75% of the molded product, etc.

The TVP may then provide a totally organic product which may further be enriched with vitamins, minerals, herbs, nutraceuticals, phytonutrients, etc., to contribute to the overall nutritional needs/requirements of an animal. The TVP may also include relatively low molecular plasticizers (e.g. MW less than 2500, including room temperature liquids) to improve the molding characteristics of the TVP in a given heated molding environment (e.g., injection molding, extrusion, compression molding, calendaring, etc.). The plasticizer content may be less than or equal to about 40% by weight, including all values and increments therein. For example, the plasticizer content in the final molded product may be less than or equal to about 20% by weight.

Textured vegetable protein herein may be understood as any vegetable protein product that has a fibrous structure. By fibrous structure it may be understood as a particulate material having a length dimension that exceeds a width or thickness measurement. TVP may be formed from defatted soy flour, which may be sourced as a by-product from the manufacture of soybean oil, and may contain 50% soy protein. It may therefore be hydrated before use. The fibrous structure of TVP may therefore approach the texture of meat. Texture may therefore be understood as a consideration of physical features of the food products, such as compressibility. It may also be appreciated that the textured vegetable protein may come from a variety of other sources, such as grains (e.g. wheat) cereals, nuts, seeds, legumes, yeast, beans and/or fruits, and mixtures thereof.

One example of a TVP suitable for use herein may be sourced from Archer Daniels Midland, Decatur, Ill., which reportedly contains crude protein (53%), moisture (9%), crude fat (3.0%), dietary fiber (18%) and about 32% carbohydrates. Such product may specifically include product sold under the designation TVP163 and/or TVP 165. Such product may also include vitamins and minerals and various amino acids. Therefore, in the context of the present disclosure, a TVP may be understood as a product that as noted above, includes a fibrous structure, and which contains more than about 50% protein (which may be derived from a soy product) along with other miscellaneous ingredients.

In addition, given the use of the TVP noted above, it may now be appreciated that the treats or chews that may be produced herein may specifically be such that they are relatively wheat-gluten free. This may be understood as a level of wheat-gluten that is less than or equal to about 5.0% by weight. Wheat gluten is reference to the amorphous mix of proteins that is typically sourced from the flour of wheat and other grains by removal of the starch component. Wheat gluten is often identified as the component that may provide for the elasticity of kneaded dough and may typically be present in a variety of baked products. Further, treats or chews which contain fiber, are low in fat, are gluten free and are relatively high in protein content may be of particular value.

Accordingly, textured vegetable protein, such as TVP® 163 or 165 from Archer Daniels Midland, was combined with water and glycerine in the ratios shown in Table 1, below, and supplied to an injection molding machine to form molded dog chews.

TABLE 1

(Weight Percent)

| | |
|---|---|
| TVP ® | 65.0 |
| Glycerine | 21.5 |
| Cellulose fiber | 8.0 |
| Lethicin | 2.0 |
| Water | 2.0 |
| Flavor Enhancer | 2.0 |
| Flavoring | 0.5 |
| | 100 |

The above indicated formulation was injection molded into a multi-cavity mold to produce a desired molded shape for a given pet product. The product was found to be plasticated with the TVP and other components substantially fused and formed into a molded part.

Accordingly, the TVP herein may be combined with a resin and a plasticizer, such as water, in an extruder and subsequently formed into attractive shapes by the injection molding process, or by other plastic molding processes such as compression molding, extrusion, laminating, etc. In addition, the present formulation may be placed in a combined injection molding/extrusion type machine.

Turning first then to the resin component, preferably, the resin may be selected from a material that is capable of flow due to heat and which may be due to heating above an indicated glass transition temperature (Tg) or melting point (Tm). In addition, the resin may be one that provides a molecular weight and/or melt viscosity that allows for the TVP (which may remain in a relatively solid particle form) to be relatively uniformly dispersed and bound in the resin during processing (e.g. extrusion or injection molding). The resin may also have an identifiable repeating unit characteristic of a polymer resin.

Accordingly, the resin may be selected from the group consisting of starch (e.g. potato starch, wheat starch), soyflour, casein, denatured and partially hydrolyzed collagen, rawhide (e.g. chopped or comminuted rawhide), thermoplastic polymers and mixtures thereof. Thermoplastic polymers include polymers such as polyamides and polyurethanes, as well as ethylene copolymers, such as poly(ethylene acrylic acid) and poly(ethylene vinyl alcohol). The rawhide, such as comminuted rawhide, may be that rawhide that is disclosed in U.S. Pat. No. 5,476,069, whose teachings are incorporated herein by reference.

As noted, it is contemplated that plasticizers may be employed to improve the plastication and processing of the TVP in the given heated molding environment. As noted, the plasticizers may include compounds that have a MW of less than or equal to about 2500. Plasticizers may therefore include water, and the plasticizers may be selected such that they may be removed (volatilized) from a given mixture during processing in a heated molding environment. The plasticizers may also be designed to remain in the final molded product. For example, the final molded product may have a plasticizer level herein of less than or equal to about 20% by weight, including all values and increments therein. It is also contemplated herein that one may utilize a mixture of plasticizers, such as a mixture of glycerine and water. In that regard, attention is directed at commonly owned U.S. Pat. No. 6,159,516, whose teachings are incorporated by reference. The process herein may therefore make use of such melt processing techniques and comprise combining, for instance, glycerine, TVP and water wherein the water content may initially be in the range of greater than about 25%, e.g. in the range of greater than 25% to about 40.0% by weight, introducing and heating said mixture in an extruder wherein the water content of said product upon discharge from said extruder is less than the water content of said product entering said extruder, and introducing the product to a heated injection molding machine and injection molding and cooling to form said molded article wherein the water content is at or below about 15% by weight.

Accordingly in connection with the above preferred process, vitamins, minerals, herbs, phytonutrients, enzymes and antioxidants may be added with the resin and textured vegetable protein prior to molding, or may optionally be combined with the resin at that point wherein the resin is to be introduced into, e.g., an injection molding machine for molding, along with the TVP. It is therefore worth noting that in the context of the present invention, it has been appreciated that the vitamins, minerals, herbs, phytonutrients, enzymes and antioxidants additives can be injection molded in the resin/TVP/plasticizer mixture without substantial thermal degradation of such additives which degradation may attenuate or eliminate their therapeutic effect. In the context of the present invention, it is therefore preferable that at least some portion of the additives remain non-degraded. Those skilled in the art will therefore recognize that in the case of the additives herein, levels as low as 50 ppm would be suitable, including levels between about 50 ppm-1000 ppm, as well as all values and increments therein.

In addition to processing at such temperatures that additives may not be significantly degraded, this process provides a method for providing a chew product containing a TVP product wherein the chew product may have a controlled amount of moisture, for instance less than or equal to about 15% by weight, such that the product may be stored, preferably in air tight packaging, for long periods of time without significant spoilage. This approach then allows such TVP products and additives to be distributed in a molded chew toy or pet treat in a preserved state such that their nutritional or therapeutic value may be maintained.

Accordingly, by incorporating the aforementioned TVP and additives in a resin/plasticizer (fluid) combination, the invention herein expands upon the use of fluid such as water to promote melt mixing of such materials with the resin without significant thermal degradation during plastication (softening for use in a melt-processing operation) in either the extrusion or injection molding equipment. Those skilled in the art will therefore recognize that the amount of water can be readily varied as may be necessary to allow for lower melt processing temperatures to minimize thermal degradation and to provide a product with a controlled amount of water. Preferably, however, the level of added plasticizer (water) upon introduction to the extruder may be set at about 20-40% by weight which may emerge from the extruder at a level of about 15-20%, at which point the extrudate may be in condition for the step of injection molding. Following injection molding, the water level may be set to about 5-20% by weight, and more preferably, 5-15%, and in a most preferred embodiment, the water level of the molded product (including the protein) may be set to about 11-14%.

It may also be appreciated that the mixture herein may be specifically introduced into a vented barrel extruder to form an extruded product which may be reduced in size for further processing, wherein the water content upon discharge from the extruder is less than the water content of said mixture entering the extruder. This extruded product may be in the form of beads or pellets or a sheet which may be cut into chunks for further melt processing. This may be followed by introduction of the extruded beads or pellets or chunks to a heated injection molding machine containing a mold and injection molding and cooling to form the molded article wherein the water content of the molded article is at or below about 15% by weight, wherein the injection molding machine contains a hopper feed section, a barrel and an output nozzle, including a plurality of heating zones in said barrel extending from said hopper section to said nozzle, wherein said plurality of heating zones are set within the following temperature ranges: zone 1=at or below about 70° F.; zone 2=at or below 150° F.; zone 3=at or below about 235° F.; zone 4=at or below about 250° F. Preferably, the mold itself is cooled to about 35-65° F.

In connection with the above, it should be pointed out that the above temperature profile may be most conveniently achieved by the use of cooling coils placed about the barrel of the injection molding machine, where such coils comprise copper cooling coils with circulating water. The advantage of such unique temperature profile, therefore, is that thermal degradation of the components (e.g. resin, protein and the optional nutritional additives noted herein) may be minimized and the water content of the final molded product may be controlled.

In another exemplary embodiment of the present invention, the molded chew toy of the present invention, including TVP, may be formed by the direct injection molding. With respect to injection molding, the molded products herein may be manufactured by a process of direct injection molding, and reference is next made to U.S. patent application Publication No. 20070031555 filed Aug. 5, 2005 entitled "Direct Starch Molding" and U.S. application Publication Nos. 20070031556 and 20070031557 filed respectively on Oct. 14, 2005 and Apr. 5, 2006 entitled "Direct Melt Processing Of Resins", all commonly assigned to the assignee of the present invention and included herein in their entirety by reference. These disclosures recite a direct injection molding process where the ingredients are mixed in the barrel of the machine and injected into a closed mold and allowed to harden.

Accordingly, for the direct injection molding contemplated herein, the TVP may be combined with resin and a fluid as noted above. Accordingly, the TVP herein may be directly injection molded accordingly to the process disclosed in U.S. application Publication No. 20070031555, which is assigned to the assignee of the present invention and included by reference herein in its entirety. As may therefore be appreciated, the TVP, or the resin, fluid and TVP may be introduced directly into the barrel of an injection molding machine and mixed therein to form a composition, foregoing the need to, e.g., mix the ingredients in an extruder and form an intermediate product (bead, pellet, etc.).

In a related exemplary embodiment, a modified screw for direct injection molding may be used for the molded products herein, according to the teachings of U.S. application Publication Nos. 20070031556 and 20070031557, which are assigned to the assignee of the present invention and included by reference herein in its entirety. The modified screw may include a transition zone having a first length L1 and a feed zone having a second length L2, wherein L1>0.5*L2. The modified screw may have a metering zone having a length L3 wherein L3>0.5*L2. In addition, the channel depth CD, the distance from the top of a flight to the screw root may be varied in the different sections of the screw. For instance, the feed zone may have a first channel depth CD1 and the metering zone a second channel depth CD2, wherein CD1>2.0*CD2.

The modified screw and/or barrel of the injection molding machine may also be specifically coated, which may impart a surface finish value "Ra" greater than 5 micro-inches. The modified screw may also include at least two flights on all or a portion of the screw. One of those flights may be a barrier flight.

Finally, one may incorporate other types of ingredients to any of the chews or pet treats herein to increase the animal's attraction and/or improve the cosmetic appearance of the molded product. For example, one may optionally incorporate flavorings at a level of about 0.1-5% by weight as well as a food coloring. In addition, one may optionally incorporate calcium carbonate which has been found to increase hardness. In addition, one may optionally incorporate a humectant such as oat fiber, in the range of about 0.1-5.0% by weight. Further, one may optionally include a preservative, such as sodium benzoate, sodium nitrate or calcium propionate.

The processes consistent with the present invention may therefore be used for manufacturing edible molded animal treats and/or edible animal chews. Animal treats consistent with the present invention may be fully consumed by a pet or animal. As such, when the desired product is an animal treat it may also be formed from ingredients providing nutritional benefits. Similarly, animal chews consistent with the present invention may be intended to provide nutritional value along with oral health benefits, serving to massage the gums of the pets during the chewing action, etc. Furthermore, as noted earlier, the product herein may alternatively be formed from edible or even non-edible ingredients, wherein the non-edible ingredient may be selected, among other reasons, to provide extended durability when chewed by an animal.

Furthermore, it should also be understood by those having skill in the art, however, that any classification of "treat" or "chew" or "chew toy" as used herein has no bearing on the scope of the invention herein. In addition, it must also be noted that the concept of animal treat or chew herein is not limited and may extend to birds, small mammals, etc.

This invention has been set forth in detail, but it should be understood by those skilled in the art that the various examples herein are by way of illustration only and the features of each example or embodiment may be interchanged. Modifications and variation will therefore be apparent and may be resorted to without departing from the spirit and equivalent scope of this invention. Accordingly, such modifications and equivalents are considered to be within the purview of the scope of the invention as set forth in the following claims.

What is claimed is:

1. A method for forming an edible animal chew toy or pet treat comprising:
    combining resin, a plasticizer and textured vegetable protein to form a mixture, wherein the resin comprises starch, and wherein the textured vegetable protein is present at a level of equal to or greater than 60% by weight of said mixture, and wherein said textured vegetable protein comprises fibrous structure material having a length dimension, a width and thickness dimension where said length dimension exceeds said width and thickness dimension, and wherein said textured vegetable protein contains crude protein, dietary fiber and carbohydrates, and wherein the textured vegetable protein is at least 50% crude protein; and
    introducing said mixture to a heated molding machine and molding and cooling said mixture to form said chew toy or pet treat wherein said plasticizer content of said chew toy is less than or equal to 40% by weight and wherein said textured vegetable protein is uniformly distributed in said molded chew toy; and
    wherein the animal chew toy or pet treat is gluten free and injection molded.

2. The method of claim 1 wherein prior to introducing said mixture to said heating molded machine, the plasticizer content is greater than about 40% by weight.

3. The method of claim 1 wherein said plasticizer has a molecular weight of less than or equal to about 2500.

4. The method of claim 1 wherein said heated molding machine comprises an injection molding machine.

5. The method of claim 1 wherein said resin further comprises a composition selected from the group consisting of casein, denatured and partially hydrolyzed collagen, rawhide, thermoplastic polymers and mixtures thereof.

6. The method of claim 1 wherein said plasticizer is water.

7. The method of claim 1 further including one or more of vitamins, minerals, herbs, phytonutrients, enzymes, flavorants, lecithin, and antioxidants.

8. A method for direct injection molding textured vegetable protein in an injection molding machine including a screw, a barrel and a mold to produce a molded animal chew toy or pet treat, comprising:
    introducing ingredients of a composition comprising textured vegetable protein, a resin comprising starch and plasticizer directly into an injection molding machine wherein the textured vegetable protein is present at a level of equal to or greater than 60% by weight of said textured vegetable protein, resin and plasticizer, and wherein said textured vegetable protein comprises fibrous structure material having a length dimension, a width and thickness dimension where said length dimension exceeds said width and thickness dimension, and wherein said textured vegetable protein contains crude protein, dietary fiber and carbohydrates, and wherein the textured vegetable protein is at least 50% crude protein and wherein the composition is wheat-gluten free;
    mixing said resin, said textured vegetable protein and said plasticizer in said molding machine and forming a mixture; and
    forming said mixture into a molded shape wherein said textured vegetable protein is uniformly distributed in said molded animal chew toy or pet treat, and wherein the animal chew toy or pet treat is gluten free and injection molded.

9. The method of claim 8 wherein said resin further comprises a composition selected from the group consisting of casein, denatured and partially hydrolyzed collagen, rawhide, thermoplastic polymers and mixtures thereof.

10. The method of claim 9 wherein said step of introducing said resin, said textured vegetable protein and said plasticizer directly into the barrel of the injection molding machine further includes incorporating one or more additives.

11. The method of claim 9 wherein said injection machine includes a modified screw, said modified screw comprising a transition zone having a first length L1 and a feed zone having a second length L2, wherein L1>0.5*L2.

12. The method of claim 11 wherein said modified screw further comprises a metering zone having a third length L3, wherein L3>0.5*L2.

13. The method of claim 12 wherein said feed zone has a first channel depth CD1 and said metering zone has a second channel depth CD2, wherein CD1>2.0*CD2.

14. A molded animal chew toy or pet treat comprising:
    resin comprising starch, plasticizer and textured vegetable protein, wherein said textured vegetable protein is present at a level of equal to or greater than 60% by weight of said chew or treat, and wherein said textured vegetable protein comprises fibrous structure material having a length dimension, a width and thickness dimension where said length dimension exceeds said width and thickness dimension, and wherein said textured vegetable protein contains crude protein, dietary fiber and carbohydrates, and wherein the textured vegetable protein is at least 50% crude protein and wherein said plasticizer content of said chew toy is less than or equal to 40% by weight and wherein said textured vegetable protein is uniformly distributed in said molded animal chew toy or pet treat, and wherein the animal chew toy or pet treat is gluten free and injection molded.

* * * * *